US006947736B2

(12) United States Patent
Shaver et al.

(10) Patent No.: US 6,947,736 B2
(45) Date of Patent: Sep. 20, 2005

(54) UNIVERSAL BROADBAND HOME NETWORK FOR SCALABLE IEEE 802.11 BASED WIRELESS AND WIRELINE NETWORKING

(75) Inventors: Donald P. Shaver, Dallas, TX (US); Ricky Curtis, Sherman, TX (US); William C. Timm, McKinney, TX (US); Murtaza Ali, Plano, TX (US); Terence J. Riley, Rockwall, TX (US); Harshal S. Chhaya, Plano, TX (US); Jin-Meng Ho, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 298 days.

(21) Appl. No.: 10/299,729

(22) Filed: Nov. 19, 2002

(65) Prior Publication Data

US 2003/0114153 A1 Jun. 19, 2003

Related U.S. Application Data

(60) Provisional application No. 60/331,616, filed on Nov. 20, 2001, and provisional application No. 60/341,168, filed on Dec. 13, 2001.

(51) Int. Cl.$^7$ .......................... H04Q 7/20; H04M 11/00; H04N 9/00; H04L 12/66
(52) U.S. Cl. .................. 455/424; 455/74.1; 455/426.2; 455/552.1; 379/93.07; 379/93.11; 379/413.03; 370/401; 370/466
(58) Field of Search .............................. 455/424, 426.2, 455/428, 462, 463, 73, 74.1, 552.1, 554.2, 553.1, 555–556.7, 557; 379/93.05, 93.07, 93.11, 399.1, 413.02, 413.03–413.04; 370/401, 463, 466

(56) References Cited

U.S. PATENT DOCUMENTS

| | | | | |
|---|---|---|---|---|
| 6,141,356 A | * | 10/2000 | Gorman | 370/493 |
| 6,453,040 B1 | * | 9/2002 | Burke et al. | 379/387.01 |
| 6,457,038 B1 | * | 9/2002 | Defosse | 709/200 |
| 6,509,841 B1 | * | 1/2003 | Colton et al. | 340/870.11 |
| 6,512,755 B1 | * | 1/2003 | Deschaine et al. | 370/338 |
| 6,560,234 B1 | * | 5/2003 | Ben-Michael et al. | 370/401 |
| 6,751,441 B1 | * | 6/2004 | Murray et al. | 455/7 |
| 6,760,748 B1 | * | 7/2004 | Hakim | 709/204 |
| 2002/0128009 A1 | * | 9/2002 | Boch et al. | 455/426 |
| 2003/0012365 A1 | * | 1/2003 | Goodman | 379/413.02 |
| 2003/0156012 A1 | * | 8/2003 | Omidi et al. | 340/310.01 |
| 2003/0203717 A1 | * | 10/2003 | Chuprun et al. | 455/12.1 |
| 2003/0224784 A1 | * | 12/2003 | Hunt et al. | 455/426.2 |

* cited by examiner

*Primary Examiner*—Binh K. Tieu
(74) *Attorney, Agent, or Firm*—Abdul Zindani; W. James Brady, III; Frederick J. Telecky, Jr.

(57) ABSTRACT

The present home networking method and system is based on the IEEE 802.11 wireless networking standard expanded to encompass home phone line media communication and/or home power line media communication operation seamlessly. For each station in home network (i.e., wireless, phone line and power line), the protocol stack at the PHY layer and above, QoS, and network security are all based on the 802.11 standard. Chipset implementations differ in an applied analog interface that is specific to the respective medium. Station-to-station transmission between wireless and wired terminals is enabled via an intelligent access point which includes an analog interface for each of the medium types. Further, each station can be configured with the appropriate analog interface to communicate directly with any wireless station. The access point is also expandable to form extended service sets.

20 Claims, 3 Drawing Sheets

UNIVERSAL BROADBAND HOME NETWORK FOR SCALABLE IEEE 802.11 BASED WIRELESS AND WIRELINE NETWORKING

This application claims the priority under 35 U.S.C. 119(e)(1) of copending U.S. provisional application No. 60/331,616, filed on Nov. 20, 2001, and 60/341,168, filed on Dec. 13, 2001, both of which are incorporated herein by reference.

BACKGROUND OF THE INVENTION

1. Technical Field of the Invention

The present invention generally relates to data communications and, more particularly, to a method and system of network interfacing across both wired and wireless networks in a home environment.

2. Description of Related Art

Home networking is a key technology for the evolvement of the home information/entertainment market. It is expected to become a very large market itself within the next decade. Home networks can connect computing devices (personal computers, palm computers, network computers, etc.), entertainment devices (TV, set-top box, VCR, DVD, video camera, audio system, etc.), I/O devices (printers, scanner, head-sets, etc.), home appliances, and modems that connect the home to the outside. This home interconnection network can enable a wide range of applications such as Internet sharing, peripheral sharing, file and application sharing, and home automation. However, in current home networking solutions, variously different standards and hardware/software are used for various wireless and wireline applications.

SUMMARY OF THE INVENTION

The present invention achieves technical advantages as a method and system for home networking based on the IEEE 802.11 wireless networking standard expanded to encompass home phone line media communication and/or home power line media communication operation seamlessly. The present home network (HomeAll) concept addresses the severely fragmented home networking market and standards by defining a universal networking solution that reuses hardware and/or software across both wired and wireless networks. For each station in home network (i.e., wireless, phone line and power line), the protocol stack at the PHY layer and above, QoS, and network security are all based on the 802.11 standard. Chipset implementations differ in an applied analog interface that is specific to the respective media. Station-to-station transmission between wireless and wired terminals is enabled via an intelligent access point which includes an analog interface for each of the media types.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
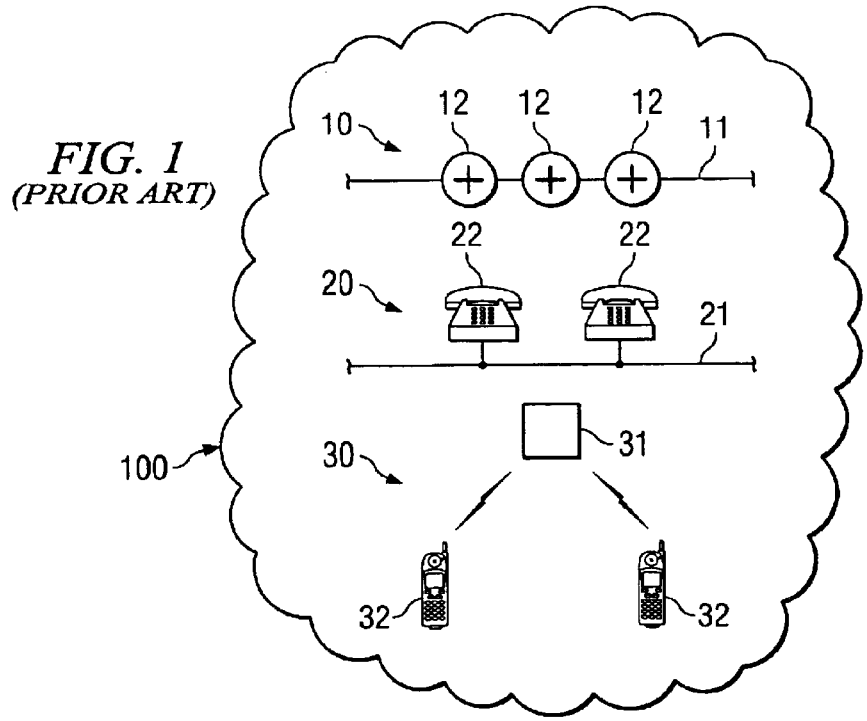
FIG. 1 illustrates an exemplary home network comprising three independent communication networks; a power line network, a phone line network, and a wireless network.

The numerous innovative teachings of the present application will be described with particular reference to the presently preferred exemplary embodiments. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

Throughout the drawings, it is noted that the same reference numerals or letters will be used to designate like or equivalent elements having the same function. Detailed descriptions of known functions and constructions unnecessarily obscuring the subject matter of the present invention have been omitted for clarity.

Referring now to FIG. 1 there is illustrated an exemplary home network 100 comprising three independent communication networks; a power line network 10, a phone line network 20, and a wireless network 30. Each independent network includes communication stations operating with conventional protocol stacks (including the MAC and PHY) dependent on the transmission medium of the network. That is, the power line stations 12 operate with protocol stacks typical for use with a power line medium 11, the phone line stations 22 operate with protocol stacks typical for use with a phone line medium 21, and the wireless stations 32 operate with protocol stacks typical for wireless use. Thus, the power line stations 12 communicate with each other via the power line 11, the phone line stations 22 communicate with each other via the phone line 21, and the wireless stations 32 can communicate with each other wirelessly via a conventional transceiver 31. However, within the home network 100, a station from one network does not communicate with a station from another network. For example, there are no bridges for a phone line station 22 to communicate with a wireless station 32 independent of communication channels outside the home network 100.

Figure 2:
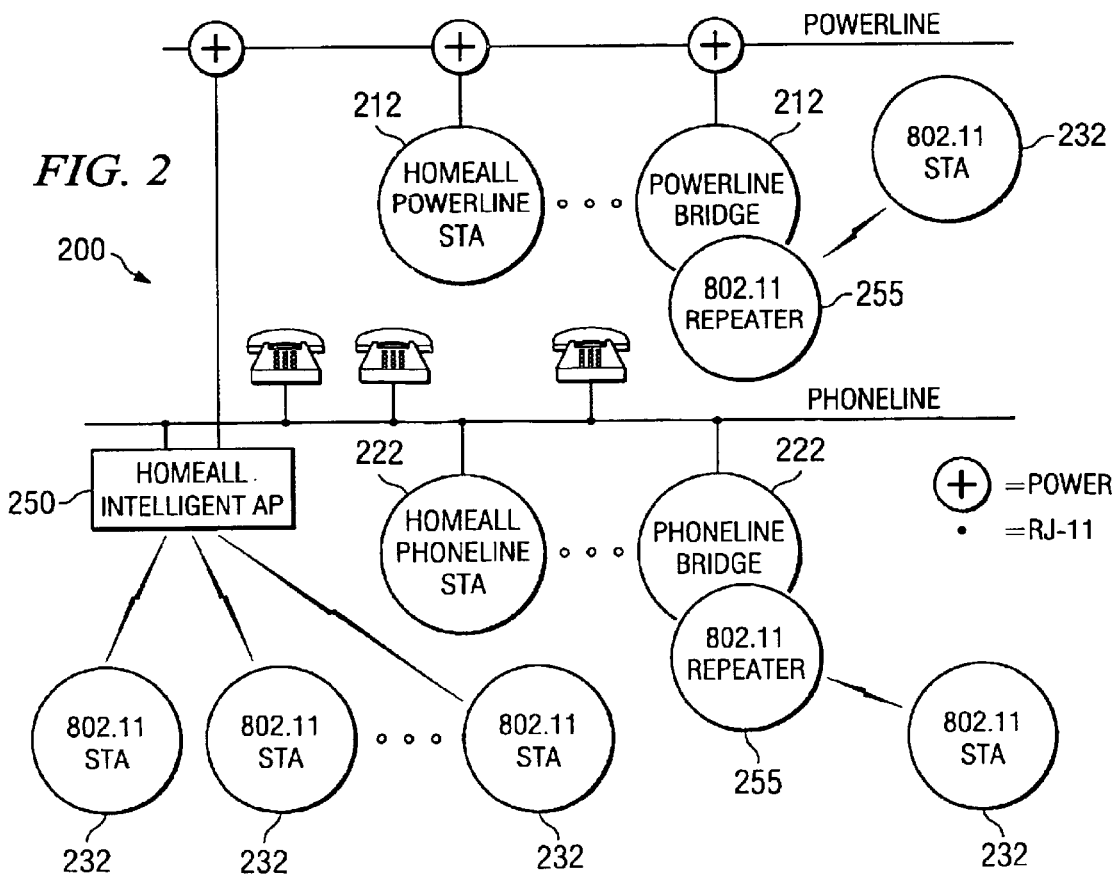
FIG. 2 illustrates a home network in accordance with an exemplary embodiment of the present invention.

Referring now to FIG. 2 there is illustrated a home network 200 in accordance with exemplary embodiments of the present invention (hereinafter referred to as HomeAll). HomeAll 200 addresses the severely fragmented home networking standards, as exemplified in FIG. 1, by defining a universal network solution that can reuse assets across both wired and wireless networks. HomeAll 200 is a range extender for full premises coverage using existing premises wiring without the need for bridging multiple access points built on different protocol stacks while retaining QoS and throughout performance. The premises can include, for example, homes, hotels, apartment buildings, and offices. Examples of HomeAll 200 are described herein (for purposes of exposition only) in terms of the IEEE 802.11 wireless networking standard (incorporated herein by reference) that is expanded to encompass home phone line and power line operation in a seamless way and is compatible with 802.11a and b type devices. More particularly, the baseband physical layer and media access control portions of the 802.11 standard remain unchanged except for minor application-specific portions in the baseband physical layer. These changes include changes in the number of tones used per data-frame to better match the frequency characteristics of the given physical medium. The 802.11 standard uses 64 tones per data-frame for the wireless medium. The current invention will continue to use this value of 64 tones per data-fame for the wireless medium and will expand this to 256 tones per data-frame for phone line and power line media. There will be a corresponding medium dependent processing delay for each physical medium.

The transmission media (wireless, phone line, power line) are transparent at protocol stack layer 2 and above, thus enabling operation of an integrated wireless/wireline home network using substantially the same or identical software and/or hardware in each terminal device. The terminal devices include power line stations 212, phone line stations 222 and wireless stations 232 in which station-to-station transmission between wireless and wired terminals are enabled via an intelligent access point 250. Further, direct communication between stations is enabled over homogeneous transmission medium.

Figure 3:
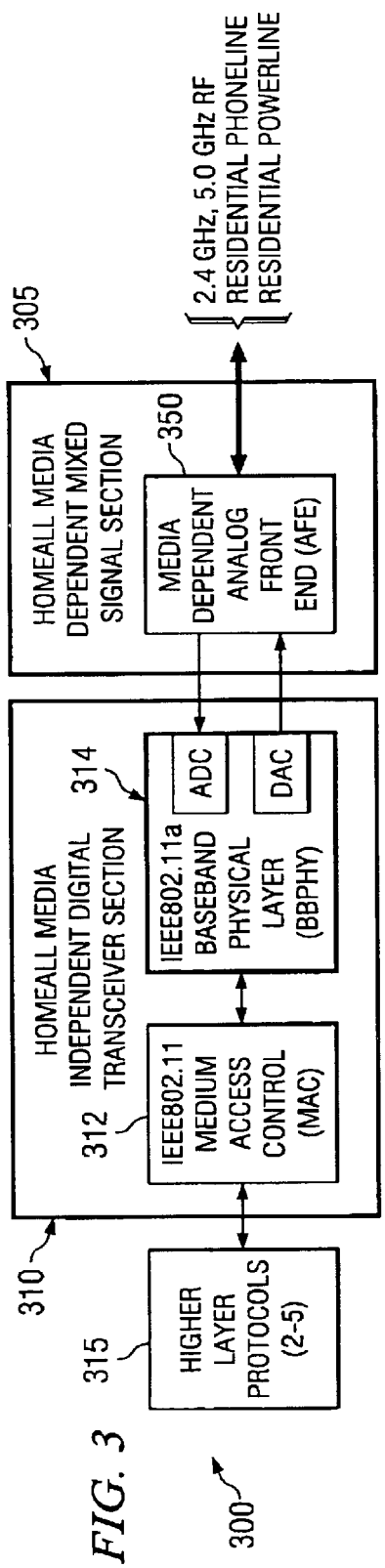
FIG. 3 illustrates a transceiver architecture of the access point and communication stations shown in FIG. 2.

FIG. 3 illustrates a transceiver architecture 300 in accordance with exemplary embodiments of the present invention, including a media dependent signal section 305, media independent digital transceiver section 310 and conventional higher layer protocols 315. The media independent digital transceiver section 310 includes a conventional medium access control (MAC) 312 coupled between a conventional baseboard physical layer 314 and the higher layer protocols 315.

The media independent digital transceiver section 310 includes the IEEE802.11 Medium Access Control (MAC) 312 and the IEEE802.11a Baseband Physical Layer (BBPHY) 314. In accordance with the present invention, the MAC 312 is the data link sublayer that is responsible for transferring data to and from the physical layer 314 and provides the protocol and control to enable access to each of the home mediums. The physical layer 314 is coupled to the MAC 312 and includes circuits for converting analog data received from the analog front end 350 to digital data and for converting digital data received from the MAC 312 to analog data for transmission to the analog front end 350. This architecture 300 can be used for each type of terminal device (power line stations 212, phone line stations 222 and wireless stations 232) and the access point 250. The media dependent mixed signal section 305 includes at least one analog front end (AFE) for interfacing with a specific medium. An AFE includes the transmitter, receiver and other typical hardware/software providing the interface between a specific medium and the physical layer 314 for encoding/decoding and modulating/demodulating. An AFE specific for each of wireless, phone line, and power line can be included in a station or access point 250. That is, the AFEs are interchangeably connectable to each type of station and the access point 250. For example, one AFE can be included for wireless operating at either 2.4 GHz or 5.0 GHz, one for phone line operating in a 20 MHz band above 2 MHz over standard home phone wiring, and one for power line operating in a 20 MHz band above 2 MHz.

In one embodiment, the access point 250 includes three AFEs each adapted to communicate with a different one of the medium types discussed; a wireless station 232 includes only an AFE adapted to communicate with the wireless medium; a phone line station 222 includes only an AFE adapted to communicate with the phone line medium; and a power line station 212 only includes an AFE adapted to communicate with the power line medium. The same (or substantially the same) digital transceiver section 310 and higher layer protocols can be used in each station 212, 222 and 232, and in access point 250. With an access point 250 adapted to communicate with all three medium types, each type of terminal device (station) can communicate station-to-station with different types of terminal devices via the access point 250. Of course, direct communication between terminal devices is enabled over homogeneous transmission medium.

In another embodiment, the phone line station 222 and the power line station 212 can also include a repeater section 255 adapted to communicate directly with a wireless station 232 within the HomeAll 200. The repeater section 255 only provides for access between one type of wired medium and the wireless medium, where the access point 250 coordiantes accesses to all wired and wireless medium. There is only a single access point in the HomeAll network 200. The repeater section 255 then serves to extend the network reach to wireless station which can not access the access point directly (this can happen when a wireless station 232 is far away from the access point 250). The repeater section 255 includes an AFE adapted to communicate with the wireless medium. Thus, for example, a power line station 212 adapted with a repeater section 255 can communicate directly with wireless stations 232 as well as with other power line stations, and station-to-station with phone line stations 222 via the access point 250.

As above mentioned, the access point 250 coordinates and interconnects access between any user stations connected to the same or different media within HomeAll 200. Such a communication link, or bridge, is enabled by the built-in address fields in the 802.11 MAC frames, and is transparent to layers above the MAC. In particular, the 802.11 MAC data frames have up to four address fields, each specifying a source address (SA), a transmitter address (TA), a receiver address (RA), and a destination address (DA). The access point 250 can forward a data frame received from a communication link (such as on a wireless medium) to another communication link (such as on a wireline medium) based on the SA and DA values in the received frame, thereby bridging the two subnetworks comprising these two links. Thus, no upper layer bridging is needed for interconnecting two stations using different communications media.

Figure 4:
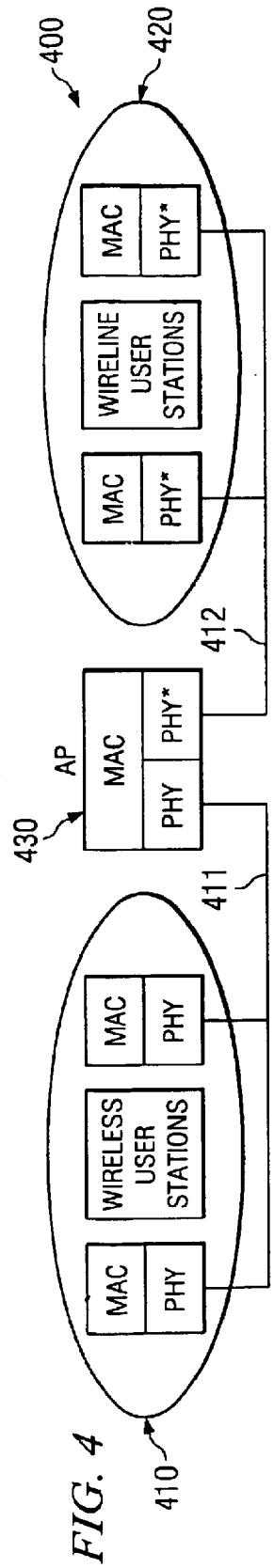
FIG. 4 illustrates a simplified MAC architecture 400 in accordance with an aspect of the present invention.

FIG. 4 illustrates at 400 exemplary embodiments of a MAC architecture in accordance with the present invention. This architecture includes wireless user stations 410 and wireline+user stations 420 each in communication with an access point (AP) 430. The AP 430 has a single MAC and two transport medium dependent physical layers, one interfaced to the wireless medium 411 by a suitable AFE (not shown) and one interfaced to the wireline medium 412 by a suitable AFE (not shown). The "PHY*" in FIGS. 4–6 indicates a physical layer tailored to the wireline medium. Each user station also contains a MAC and a wireless (410) or wireline (420) transport medium dependent physical layer for communication with the corresponding physical layer in the AP 430. Using this single MAC architecture, timing hierarchies, such as aSlotTime and Short Interframe Space, related to the wireless and wireline media should be the same for a single MAC to function properly on both media. This is because on, i.e., transmissions to and receptions from, the wireless and wireline media are coordinated by a single MAC. The timing hierarchies may be derived from the worst case scenario. For instance, the value of aSlotTime and Short Interframe Space is set to be the larger of the corresponding values pertaining to the wireless or wireline medium. In addition, a single MAC at the AP 430 may not allow for simultaneous use of the wireless and wireline media since the MAC cannot process frames transmitted to, or received from, different media at the same time.

Figure 5:
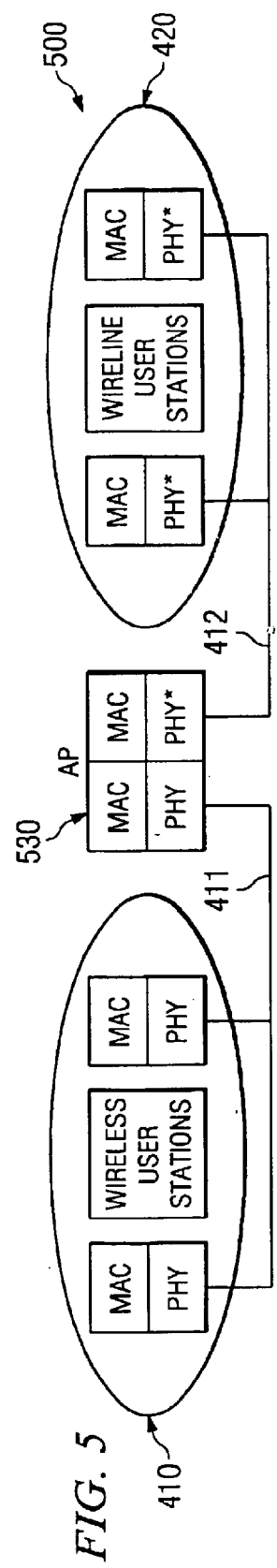
FIG. 5 illustrates another simplified MAC architecture 500 in accordance with an aspect of the present invention.

FIG. 5 illustrates at 500 further exemplary embodiments of a MAC architecture in accordance with the present invention. Again, the AP 530 coordinates and interconnects access of both wireless 410 and wireline 420 user stations. However, this AP 530 has two MACs and two transport medium dependent physical layers, one MAC-PHY pair handling the wireless medium and one pair handling the wireline medium. The problem associated with different processing delays of each type of media is addressed with this dual MAC architecture enabling the two physical layers to have different signal processing delays. Thus, timing hierarchies related to the wireless and wireline media need not be the same since access to each medium is handled by a separate MAC. In addition, each MAC can process frames transmitted to, or received from, the corresponding medium independently, thus enabling simultaneous use of the wireless and wireline media.

Figure 6:
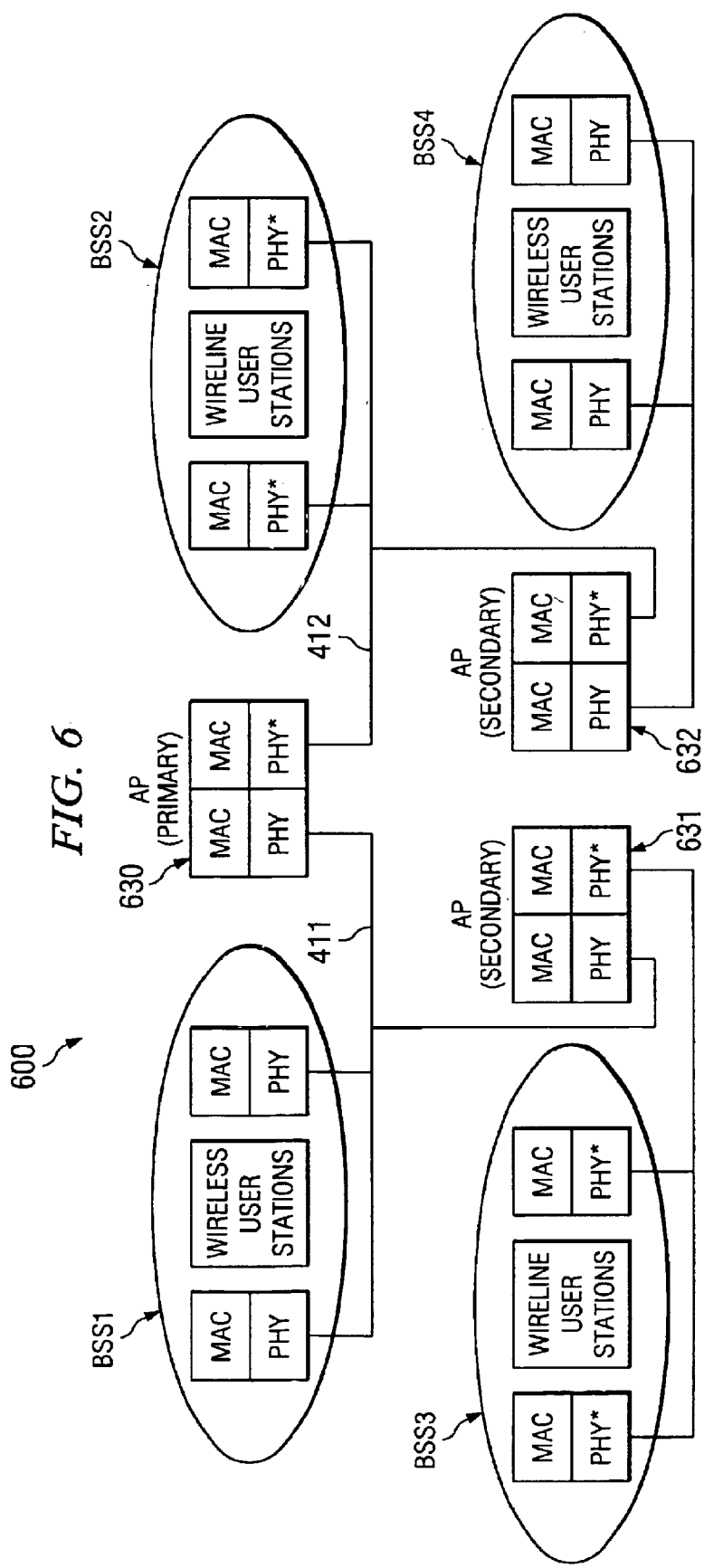
FIG. 6 illustrates an extended service set using the MAC architecture shown in FIG. 5.

Multiple dual MAC APs such as AP 530 can also be configured to form an extended service set to enable extended coverage. FIG. 6 illustrates at 600 exemplary embodiments of an extended service architecture according to the invention, including a primary MAC AP 630 and two secondary APs (631,632). Each AP includes the dual MAC architecture described above at 530 in FIG. 5. The primary AP 630 coordinates and interconnects access of "nearby" wireless and wireline user stations and the secondary APs (631,632). The secondary APs (631,632) coordinate access of "remote" wireless and wireline user stations and connect them to the primary AP 630. A set of stations controlled directly by a specific MAC-PHY pair of an AP constitutes a logical basic service set (BSS) as known in 802.11. FIG. 6 shows four separate BSSs: BSS1 which includes a group of wireless user stations controlled directly by a first MAC-PHY pair in the primary AP 630; BSS2 which includes a group of wireline user stations controlled directly by a second MAC-PHY pair in the primary AP 630; BSS3 which includes a group of wireline user stations controlled directly by a first MAC-PHY pair in secondary AP 631; and BSS4 which includes a group of wireless user stations controlled directly by a first MAC-PHY pair in secondary AP 632.

Connections between the primary AP 630 and the secondary APs (631,632) (i.e., distributed system, or DS, in 802.11 terminology) share the same wireless or wireline medium as the user stations and hence are based on the 802.11 MAC as well. Each of the secondary APs (631,632) function as user stations in a BSS of the primary AP 630. Thus, AP 631 is in communication with AP 630 via the same wireless medium as the wireless user stations of BSS1 and AP 632 is in communication with AP 630 via the same wireline medium as the wireline user stations of BSS2. This advantageous approach enables a seamless internetworking (i.e., wireless and wireline media) using common hardware and/or software components and standard protocol layering in an extended service set configuration and provides, a means for in-home, 802.11 inter-BSS operation using existing premises wiring.

In some exemplary embodiments, the access points 250, 430, 530 and 630 can be implemented in a home, small office, or other situations where networking is desired without adding additional infrastructure.

Although a preferred embodiment of the method and system of the present invention has been illustrated in the accompanied drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A system of networking wireless and wireline communications, comprising:
   a plurality of transmission mediums operable for data transmission in a home environment;
   a plurality of station types operable to communication through said plurality of transmission mediums, each of said station types is operable to communicate through one of said plurality of transmission mediums;
   an access point realized within the home environment and operable to communication through each of said plurality of transmission mediums, said access point operable to coordinate communication between disparate station types through corresponding ones of said plurality of transmission mediums.

2. The system of claim 1 further including a plurality of front end devices operable to interface said access point to said plurality of transmission mediums, wherein each of said front end devices is adapted to provide modulation and demodulation functionality compatible with a corresponding one of said plurality of transmission mediums.

3. The system of claim 2, wherein said front end devices are operatively interchangeable with said plurality of station types for interfacing with said plurality of transmission mediums.

4. The system of claim 2, wherein said access point further includes a digital transceiver interchangeably connectable to any of said plurality of front end devices and operable for providing protocol and control functionality for communications between disparate station types.

5. The system of claim 4, wherein said digital transceiver includes an baseband physical layer compatible with the IEEE802.11 wireless networking standard and a Medium Access Control compatible with the IEEE802.11 wireless networking standard.

6. The system of claim 1, wherein said plurality of transmission mediums include power line medium, phone line medium and wireless medium.

7. The system of claim 6, wherein said access point includes three front end devices one for each of said power line medium, said phone line medium and said wireless medium, wherein said front end devices provides modulation and demodulation functionality compatible with a corresponding one of said plurality of transmission mediums.

8. The system of claim 1, wherein said station types include a power line station which includes a front end device operatively compatible with said power line medium, a phone line station which includes a front end device operatively compatible with said phone line medium, and a wireless station which includes a front end device operatively compatible with said wireless medium, wherein said front end devices provides modulation and demodulation functionality compatible with a corresponding one of said plurality of transmission mediums.

9. The system of claim 8 further including a repeater station, wherein said repeater station includes a wireless front end device and one of a power line front end device and a phone line front end device.

10. The system of claim 1, wherein said access point includes a digital transceiver having a medium access controller operatively compatible with wire line and wireless transmission medium and coupled to a first baseband physical layer being operatively compatible with communications to wire line station types through a wire line transmission medium and a second baseband physical layer being operatively compatible with communications to wireless station types through a wireless transmission medium, said medium access controller providing protocol and control of data transfer to and from said first baseband physical layer and said second baseband physical layer.

11. The system of claim 1, wherein said access point includes a digital transceiver having a first medium access controller operatively compatible with wire line transmission medium and a second medium access controller operatively compatible with wireless transmission medium, said first medium access controller being coupled to a first baseband physical layer being operatively compatible with communications to wire line station types through a wire line transmission medium, said second medium access controller being coupled to a second baseband physical layer being operatively compatible with communications to wireless station types through a wireless transmission medium, said first medium access controller providing protocol and control of data transfer to and from said first baseband physical layer and said second medium access controller providing protocol and control of data transfer to and from said second baseband physical layer.

12. A system of networking communications through wireless and wireline transmission mediums, comprising:
   a first plurality of wireless user stations adapted to transceive data through the wireless transmission medium;
   a first plurality of wireline user stations adapted to transceive data through the wireline transmission medium; and
   an access point in communication with each of said first plurality of wireless user stations and said first plurality of wireline user stations and adapted to coordinate communication there between through respective transmission mediums, said access point including;
      a first baseband physical layer operatively compatible with the wireless transmission medium;
      a second baseband physical layer operatively compatible with the wireline transmission medium;
      a media access control operatively compatible with the wireless and wireline transmission mediums and coupled to said first baseband physical layer and said second baseband physical layer, said media access control adapted to provide protocol and control of data transfer to and from said baseband layers.

13. The system of claim 12, wherein said first baseband physical layer, said second baseband physical layer, and said media access control are modular, wherein wireless user stations also include said first baseband physical layer and said media access control, and wherein said wireline user stations include said second baseband physical layer and said media access control.

14. The system of claim 13 further including a second plurality of wireless user stations in communication with said access point second baseband physical layer through the wireline transmission medium via a first remote access point, and further including a second plurality of wireline user stations in communication with said access point first baseband physical layer through the wireless transmission medium via a second remote access point.

15. The system of claim 14, wherein said first remote access point includes a modular first baseband physical layer in communication with said second plurality of wireless user stations and a modular second baseband physical layer in communication with said access point first baseband physical layer, said first remote access point further including a modular media access control coupling to each of said modular first baseband physical layer and said modular second baseband physical layer.

16. The system of claim 14, wherein said second remote access point includes a modular first baseband physical layer in communication with said access point first baseband physical layer and a modular second baseband physical layer in communication with said second plurality of wireline user stations, said second remote access point further including a modular media access control coupling to each of said modular first baseband physical layer and said modular second baseband physical layer.

17. An apparatus for networking a plurality of station types in a home environment, comprising:
   a medium dependent mixed signal section connectable to a plurality of transmission mediums and operable for receiving arid transmitting analog signals through said plurality of transmission mediums, wherein each of the plurality of station types communicate through one of said plurality of transmission mediums; and
   a medium independent digital transceiver section coupled to said medium dependent mixed signal section and having a baseband physical layer being operatively compatible with each of said plurality of transmission mediums and a media access controller adapted to provide the protocol and control of data transferred to and from said baseband physical layer for enabling communications between disparate station types.

18. The apparatus of claim 17, wherein said medium dependent mixed signal section includes a plurality of interchangeable front end devices operable to interface said medium independent digital transceiver section to said plurality of transmission mediums, wherein each of said front end devices is adapted to provide modulation and demodulation functionality compatible with a corresponding one of said plurality of transmission mediums.

19. The apparatus of claim 17, wherein said plurality of transmission mediums include power line medium, phone line medium and wireless medium.

20. The apparatus of claim 19, wherein said medium dependent mixed signal section includes three front end devices one for each of said power line medium, said phone line medium and said wireless medium, wherein said front end devices provides modulation and demodulation functionality compatible with a corresponding one of said plurality of transmission mediums.

* * * * *